US008984185B2

(12) United States Patent
Lang et al.

(10) Patent No.: US 8,984,185 B2
(45) Date of Patent: Mar. 17, 2015

(54) COMPUTING ARRANGEMENT

(75) Inventors: Thomas Lang, Munich (DE); Martin Orehek, Munich (DE)

(73) Assignee: Vodafone GmbH, Duesseldorf (DE)

( * ) Notice: Subject to any disclaimer, the term of this patent is extended or adjusted under 35 U.S.C. 154(b) by 80 days.

(21) Appl. No.: 12/807,163

(22) Filed: Aug. 30, 2010

(65) Prior Publication Data

US 2011/0246690 A1    Oct. 6, 2011

(30) Foreign Application Priority Data

Mar. 31, 2010 (EP) ..................................... 10158705

(51) Int. Cl.
*G06F 13/12* (2006.01)
*G06F 3/038* (2013.01)

(52) U.S. Cl.
CPC ...................................... *G06F 3/038* (2013.01)
USPC .................... 710/62; 710/64; 710/72; 710/74

(58) Field of Classification Search
CPC .......................................................... G06F 3/038
See application file for complete search history.

(56) References Cited

U.S. PATENT DOCUMENTS

| | | | | |
|---|---|---|---|---|
| 5,428,806 A * | 6/1995 | Pocrass | ............................ | 710/104 |
| 6,083,270 A * | 7/2000 | Scott | ................................ | 703/24 |
| 6,359,636 B1 * | 3/2002 | Schindler et al. | .............. | 715/846 |
| 6,359,892 B1 * | 3/2002 | Szlam | ............................ | 370/401 |
| 6,496,983 B1 * | 12/2002 | Schindler et al. | .............. | 725/153 |
| 6,516,467 B1 * | 2/2003 | Schindler et al. | .............. | 725/153 |
| 6,772,331 B1 * | 8/2004 | Hind et al. | ....................... | 713/151 |
| 6,920,614 B1 * | 7/2005 | Schindler et al. | .............. | 715/726 |
| 6,930,730 B2 * | 8/2005 | Maxon et al. | ................... | 348/734 |
| 6,950,501 B1 * | 9/2005 | Chaturvedi et al. | .............. | 379/52 |
| 7,363,398 B2 * | 4/2008 | Scott | ................................ | 710/52 |
| 7,689,704 B2 * | 3/2010 | de Kerf | .......................... | 709/230 |
| 7,814,516 B2 * | 10/2010 | Stecyk et al. | ..................... | 725/80 |
| 8,001,304 B2 * | 8/2011 | Yung et al. | ........................ | 710/74 |
| 8,380,041 B2 * | 2/2013 | Barton et al. | ................... | 386/230 |
| 2001/0056464 A1 * | 12/2001 | Ishihara et al. | ................ | 709/203 |
| 2002/0132616 A1 * | 9/2002 | Ross et al. | ....................... | 455/419 |
| 2004/0002305 A1 * | 1/2004 | Byman-Kivivuori et al. | ............................ | 455/41.2 |
| 2005/0078092 A1 * | 4/2005 | Clapper | .......................... | 345/173 |
| 2006/0062371 A1 * | 3/2006 | Vanderheiden et al. | . | 379/211.02 |
| 2008/0044000 A1 | 2/2008 | Chang | | |
| 2009/0281888 A1 * | 11/2009 | Zai et al. | ....................... | 705/14.25 |
| 2012/0268650 A1 * | 10/2012 | Song et al. | ..................... | 348/441 |

* cited by examiner

*Primary Examiner* — Henry Tsai
*Assistant Examiner* — Jing-Yih Shyu
(74) *Attorney, Agent, or Firm* — Kriegsman & Kriegsman

(57) ABSTRACT

The present invention relates to a computing arrangement (10), said computing arrangement (10) comprising a computer device (11), multiple input- and/or output-devices (14, 15, 17, 19, 21, 22) attached to said computer device (11). In order to allow the parallel usage of multiple input- and/or output-devices which are attached to a computer device as peripheral devices, the computing arrangement (10) is characterized by a control device (20) for associating said multiple input- and/or output devices (14, 15, 17, 19, 21, 22) to at least two different GUI (Graphical User Interface) instances.

5 Claims, 2 Drawing Sheets

COMPUTING ARRANGEMENT

Figure 1:
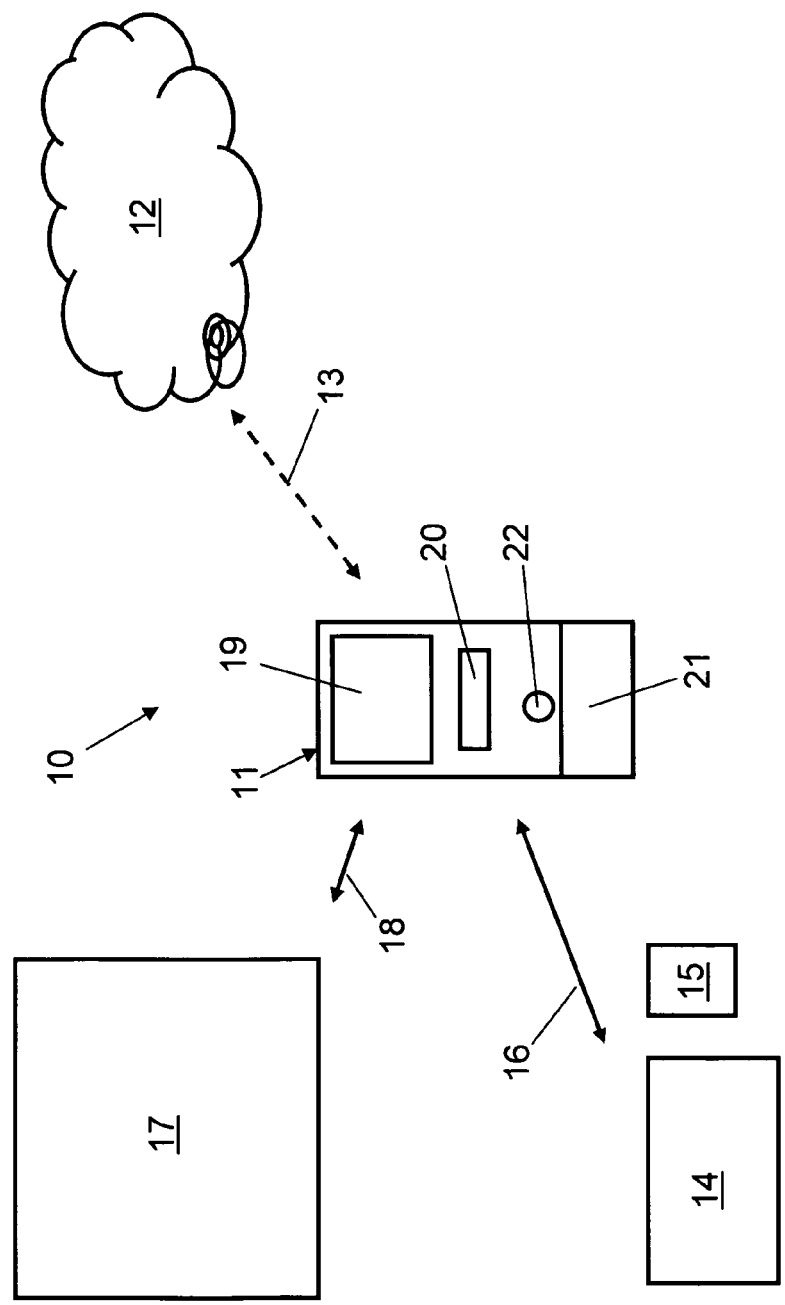

The present invention relates to a computing arrangement according to the preamble of claim 1.

In recent years the development in the field of computing arrangements has advanced rapidly. Nowadays it is possible that multiple peripheral devices are linked to one computer device. It is known in the general prior art that a computing arrangement which comprises a computer device, can further comprise multiple input- and/or output-devices attached to said computer device as peripheral devices. At present, if multiple input devices such as mouse-devices, keyboard-devices or the like are attached to a computer device, all input devices interact with the same Graphical User Interface (GUI). With regard to mouse-devices this means for example that one mouse pointer is moved on the GUI by all mouse-devices at the same time. The same applies for any other input-device or output-device, such as a keyboard, a display, a loudspeaker or the like.

It is the object of the present invention to provide a computing arrangement which allows the parallel usage of multiple input- and/or output-devices which are attached to a computer device as peripheral devices.

The object is solved by the computing arrangement comprising those features according to independent claim 1. Additional features and details of the invention are evident from the dependent claims, from the description and from the drawings.

The present invention is based on the general finding that multiple input- and/or output-devices which are attached to a computer device, can be associated to different graphical user interface instances. For example, two different keyboards could be attached to one computer device. In particular, the present invention is directed to a peripherals cluster system for graphical user interface.

According to the present invention, the object is solved by a computing arrangement, said computing arrangement comprising a computer device and multiple input- and/or output-devices attached to said computer device. The computing arrangement is characterized by a control device for associating said multiple input- and/or output devices to at least two different GUI (Graphical User Interface) instances.

The computing arrangement according to the present invention comprises a computer device. However, the present invention is not limited to specific types of computer devices. For example, the computer device can be formed as, or can be arranged within a mobile phone and/or a handset and/or a mobile computer and/or a stationary computer.

Furthermore, the computing arrangement comprises multiple input- and/or output-devices. At least some of those devices can be attached to said computer device as peripheral devices. Other devices can be implemented within said computer device. However, the present invention is not limited to specific types of input- and/or output-devices. For example, at least one input-device can be formed as a mouse-device and/or a keyboard-device. For example, at least one output-device can formed as a display.

In addition, the computing arrangement is characterized by a specific control device. This control device is adapted for associating said multiple input- and/or output devices to at least two different GUI instances. The control device enables the users of such input- and/or output-devices to interact with multiple GUIs, or applications, thus providing a true multi-user access to the computing arrangement.

In particular, a GUI generally is an environment wherein programs, data files, options, applications and the like are graphically represented to a user, such as a display, by use of icons, symbols, menus and the like for example. The user can mark and activate said graphical representations by use of an input-device, such as a mouse-device, a keyboard-device and the like. In particular, a GUI comprises a link or interface to at least one input-device. Via said input-device control elements of said GUI are triggered and driven. According to the present invention, an application can be subsumed under the term GUI as well.

For example, the computer device can be formed as a mobile phone. According to the present invention it is possible to link peripheral devices, such as a mouse-device and/or a keyboard-device and/or a display to said mobile phone. By making use of the present invention it is still possible to use and handle the mobile phone as a mobile phone. In this case, the control device associates the input- and/or output-devices which are implemented within said mobile phone, to a graphical user interface instance which is linked to the display which is arranged within said mobile phone. Alternatively or in addition it is also possible that the control device associates the input- and/or output-devices, which are linked to said mobile phone, to a graphical user interface instance which is linked to the external display, said external display being also linked to the mobile phone. Thus, the control device can associate those—with regard to the mobile phone—internal and external input- and/or output-devices to two different GUI instances.

The present invention represents a next step to the field of cloud computing interactions including communication.

Preferably, a number of input- and/or output-devices is grouped to at least one device-cluster. In particular, a device-cluster is a group of linked devices working together closely. Advantageously, the control device is adapted for grouping a number of input- and/or output-devices to at least one device-cluster. In such cases, the control device can be adapted for associating at least two device-clusters to at least two different GUI instances. The control device, which can be arranged as a piece of control instance, allows the user to group multiple input-devices and/or output-devices to input- and/or output-device-clusters. For example, a mouse-device A and a keyboard-device A can build one cluster A. Those clusters enable the user to interact with multiple GUIs or applications, thus providing a true multi-user access to the computing arrangement. In particular, by grouping many different task specific user interfaces devices together, for example acceleration sensors, multi-touch, other new technologies and the like, such clusters provide a highly tailored user experience.

In particular, the control device can comprise a distinguishing device for distinguishing between the user interactions of different users.

The control device keeps the relation of user interactions, device-clusters and GUIs/applications.

Figure 2:
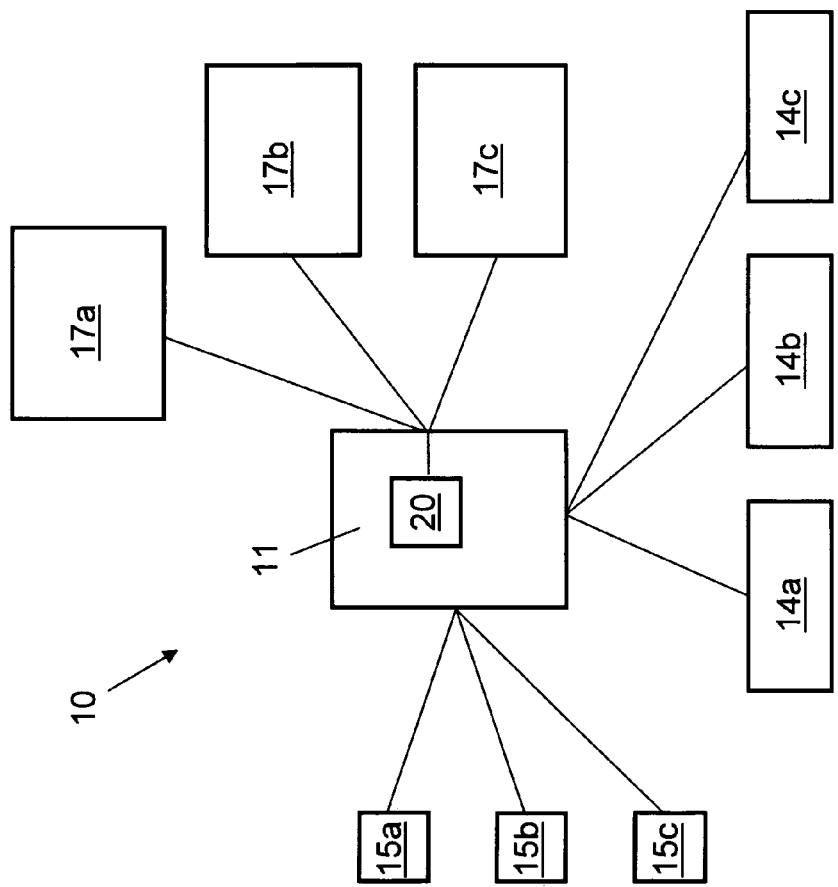

For a better understanding of the present invention preferred embodiments of the present invention will now be described by way of example with reference to the accompanying drawings, in which FIG. 1 is a schematic view of a first embodiment of a computing arrangement according to the present invention, and FIG. 2 is a schematic view of a second embodiment of a computing arrangement according to the present invention.

FIG. 1 depicts a computing arrangement 10, said computing arrangement 10 comprising a computer device 11. Said computer device 11 is formed as a mobile phone. The computer device 11 comprises an internal display 19 as an output-device. Furthermore, computer device 11 comprises an internal keyboard-device 21 and an internal mouse-device 22 as input-devices.

Via a communication network 12, computer device 11 has access to a virtual PC service which is represented by dotted arrow 13 in FIG. 1.

Computer device 11 comprises a wireless interface to an external keyboard-device 14 as well as to an external mouse-device 15. Both devices 14, 15 represent input-devices. The wireless communication between computer device 11 and input-devices 14, 15, which is indicated by arrow 16, is performed via nearfield-communication-technologies such as RFID. Computer device 11 further comprises a wireless interface to an external display 17. Display 17 represents an output-device. The wireless communication between computer device 11 and output-device 17, which is indicated by arrow 18, is performed via nearfield-communication-technologies (NFC).

In addition, computer device 11 comprises a control device 20 for associating multiple input- and/or output devices to at least two different GUI instances. In this context, GUI preferably included applications as well. Nowadays to make the OS API "portable" any Input/Output device is abstracted to finally map to the very "generic" context of a pointer or character input (Keyboard). With the arrangement according to the present invention it is possible to introduce specific/dedicated input/output devices for special applications.

According to the embodiment depicted in FIG. 1 it is possible to link peripheral devices, such as the external mouse-device 15 and the external keyboard-device 14 and the external display 17 to the computer device 11 which is formed as a mobile phone. By making use of the present invention it is still possible to use and handle the computer device 11 as a mobile phone. In this case, the control device 20 associates the input-devices 21, 22 and the output-device 19 which are implemented within said mobile phone, to a graphical user interface instance which is linked to the display 19 which is arranged within said mobile phone. Additionally it is also possible that the control device 20 associates the external input-devices 14, 15 and output-device 17 which are linked to said mobile phone, to a graphical user interface instance which is linked to the external display 17, said external display 17 being also linked to the mobile phone. Thus, the control device 20 can associate those—with regard to the mobile phone—internal and external input- and/or output-devices to two different GUI instances.

FIG. 2 depicts an embodiment, wherein a computing arrangement 10 comprises a computer device 11. The computer device 11 comprises a control device 20 for associating multiple input- and/or output devices to at least two different GUI instances. In addition control device 20 is adapted for grouping a number of input- and/or output-devices to at least one device-cluster.

In FIG. 2, computer device 11 is connected to a number of mouse-devices and keyboard-devices as input-devices. Furthermore, computer device 11 is connected to a number of displays as output devices. For a better understanding, only three devices per category are shown in FIG. 2. Therefore, three external mouse-devices 15*a*, 15*b*, 15*c* are linked to computer device 11. Furthermore, three external keyboard-devices 14*a*, 14*b*, 14*c* are linked to computer device 11. In addition, three external displays 17*a*, 17*b*, 17*c* are linked to computer device 11.

The control device 20 is adapted for grouping mouse-device 15*a*, keyboard-device 14*a* and display 17*a* to a device-cluster A, for grouping mouse-device 15*b*, keyboard-device 14*b* and display 17*b* to a device-cluster B and for grouping mouse-device 15*c*, keyboard-device 14*c* and display 17*c* to a device-cluster C. The control device 20 is further adapted for associating those device-clusters A, B, C to different GUI instances, whereby each display 17*a*, 17*b*, 17*c* is linked to a different GUI instance.

LIST OF REFERENCE NUMERALS

10 Computing arrangement
11 Computer device
12 Communication network
13 Access to a virtual PC service
14 External keyboard-device
14*a* External keyboard-device
14*b* External keyboard-device
14*c* External keyboard-device
15 External mouse-device
15*a* External mouse-device
15*b* External mouse-device
15*c* External mouse-device
16 Wireless communication
17 External Display
17*a* External Display
17*b* External Display
17*c* External Display
18 Wireless Communication
19 Internal Display
20 Control Device
21 Internal Keyboard-device
22 Internal mouse-device

The invention claimed is:

1. A computing arrangement, said computing arrangement comprising a computer device, multiple input- and/or output-devices attached to said computer device, characterized by a control device for associating said multiple input- and/or output devices to at least two different GUI (Graphical User Interface) instances, wherein each GUI is an environment wherein programs, data files, options, applications and the like are graphically represented to a user, wherein said control device is a part of said computer device, wherein said control device groups a number of input- and/or output-devices to at least one device-cluster, wherein said control device associates at least two device-clusters to at least two different GUI instances, and wherein said control device comprises a distinguishing device for distinguishing between the user interactions of different users.

2. The computing arrangement according to claim 1, characterized in that at least one input-device is formed as a mouse and/or a keyboard.

3. The computing arrangement according to claim 1, characterized in that at least one output-device is formed as a display.

4. The computing arrangement according to claim 1, characterized in that a number of input- and/or output-devices is grouped to at least one device-cluster.

5. The computing arrangement according to claim 1, characterized in that the computer device is formed as or arranged within a mobile phone and/or a handset and/or a mobile computer and/or a stationary computer.

* * * * *